Mar. 27, 1923.
C. A. BODDIE
1,449,578
FURNACE REGULATOR SYSTEM
Filed June 25, 1919
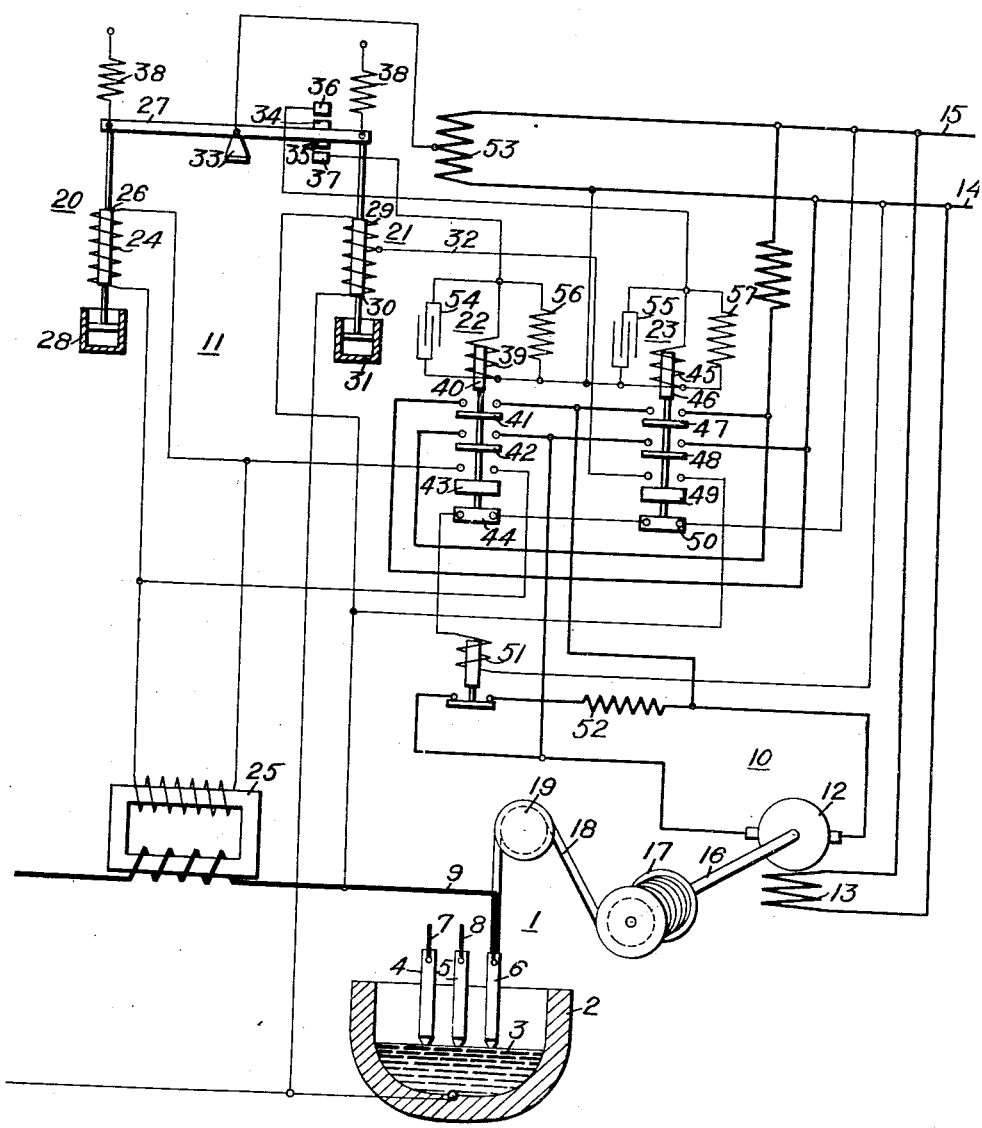
WITNESSES:
J. A. Helsel.
W. B. Wells.
INVENTOR
Clarence A. Boddie.
BY
Wesley G. Carr
ATTORNEY Patented Mar. 27, 1923.

1,449,578

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

FURNACE-REGULATOR SYSTEM.

Application filed June 25, 1919. Serial No. 306,724.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Furnace-Regulator Systems, of which the following is a specification.

My invention relates to regulator systems and particularly to regulator systems for governing the operation of electric furnaces.

The regulator system constituting the subject matter of the present application is closely related to that of applicant's copending application Serial #306,725 filed June 25, 1919 and assigned to the Westinghouse Electric and Manufacturing Company.

One object of my invention is to provide a regulator system that shall normally maintain the arcs which are produced by the various electrodes substantially constant and shall insure the electrodes against movement into the bath of material being treated.

Another object of my invention is to provide a furnace-regulator system that shall adjust each electrode not only in accordance with the current flowing through the electrode but also in accordance with the potential across the arc produced by the electrode and shall operate in a manner to prevent any hunting action.

In operating electric furnaces of the movable-electrode type, it is customary to raise and lower each electrode, relative to the bath of material being treated, by means of an electric motor and to govern the operation of the motor in accordance with the current flowing through the electrode associated with it. Such means for regulating the operation of a furnace is fairly satisfactory, under normal operating conditions, but, in case of a large wattless current or in case of failure of one of the furnace electrodes, the regulation of the furnace is not effected in a satisfactory manner.

In case a large wattless current flows through the furnace, the various electrodes are not adjusted in accordance with the heating effects produced by them and, consequently, the various electrodes do not produce equal heating effects. Thus, the quality of the material being treated is impaired by reason of the unequal heating of it and, moreover, the furnace deteriorates at a more rapid rate by reason of the uneven temperatures to which it is subjected.

In case of failure of one of the electrodes in a furnace which is provided with current regulation, as above set forth, the associated electrode or electrodes are moved to abnormal positions in order to compensate for the electrode which has failed to operate. Thus, in case the two electrodes of a furnace, which is connected to a single-phase supply circuit, are being lowered into the furnace and a very high resistance charge is disposed directly below one of the electrodes, the regulator, in order to correct such resistance in the furnace circuit, is liable to lower the other electrode even into the bath of material being treated. In a polyphase system, for example, a three-phase system, a like operation is liable to occur in case one of the electrodes meets a high-resistance charge.

In an electric furnace provided with a regulator system constructed in accordance with my invention, each movable electrode is adjusted not only in accordance with the current flowing through it but also in accordance with the potential across the arc produced by it in order to maintain a substantially constant arc and, accordingly, to maintain equal heating effects by the various electrodes. Thus, even if a large wattless current flows through the furnace, the regulation of each electrode, by means of the potential existing across the electrode arc, will maintain substantially equal heating effects by the various electrodes.

The regulator associated with each electrode for governing the operation of the electrode motor comprises an electromagnet which is operated in accordance with the current flowing through the electrode, a second electromagnet, which is operated in accordance with the potential existing across the arc produced by the electrode, and a contact arm which is moved to one position by the electromagnets for completing a circuit to operate the electrode motor in a counter-clockwise direction and thus raise the electrode from the furnace, and which is moved in an opposite direction by the electromagnets for completing a circuit to operate the electrode motor in a clockwise direction and thus lower the electrode into the furnace.

The contact arm is balanced so that, in case of failure of the supply circuit which is connected to the furnace, it will immediately assume a neutral position and prevent further operation of the electrode motor either to raise or to lower the electrode. The winding of the potential electromagnet is connected across the arc produced by the electrode so that, in case the electrode is lowered into engagement with the surface of the material being treated, the potential winding is short-circuited and further lowering of the electrode into the bath of material is prevented. In order to prevent any hunting action by the regulator, means is provided for changing the setting of the two electromagnets.

The single figure of the accompanying drawing is a diagrammatic view of a furnace-regulator system embodying my invention.

Referring to the drawing, an electric furnace 1, comprising a receptacle 2, containing a bath of material 3, and three movable electrodes 4, 5 and 6, is directly connected to a three-phase supply circuit comprising conductors 7, 8 and 9.

Each of the movable electrodes is controlled by a regulator in accordance with the current flowing through the electrode and in accordance with the voltage existing across the arc produced by the electrode and, inasmuch as these regulators are similar in construction and operation, only one regulator, namely, the regulator associated with the electrode 6, will be described in detail.

The movable electrode 6 is raised and lowered by means of a motor 10 which is governed by means of a regulator 11. The motor 10 embodies an armature 12 and a field winding 13, which is directly connected across an auxiliary supply circuit comprising conductors 14 and 15. The motor 10 is mechanically connected to the electrode 6 in any suitable manner, as by means of a shaft 16, a winding drum 17 and a flexible connector 18 which passes over a pulley 19. In the construction shown, it is apparent that, when the motor is operated in a counterclockwise direction, the electrode 6 is raised from the furnace 1 and, when the motor is rotated in a clockwise direction, the electrode is lowered into the furnace.

The regulator 11 comprises a main control electromagnet 20 which is energized in accordance with current flowing through the electrode 6, a main control electromagnet 21, which is energized in accordance with the potential across the arc produced by the electrode 6, a switch 22, which connects the motor 10 for operation in a counterclockwise direction, and a switch 23 which connects the motor 10 for rotation in a clockwise direction. The main control electromagnet 20 comprises a winding 24, which is connected to the supply conductor 9 by means of a current transformer 25, and a core armature 26. The core armature 26 is pivotally connected to a contact arm 27 and is provided with a dash-pot 28 for adjusting its speed of operation.

The main control electromagnet 21 embodies a winding 29, which is connected between the electrode 6 and the bath of material 3, and a core armature 30. The core armature 30 is pivotally connected to the contact arm 27 and is provided with a dash-pot 31 for adjusting the speed of its operation. The winding 29 is provided with a tap 32 extending from it for a purpose to be hereinafter set forth.

The contact arm 27 is pivotally mounted at a point 33 intermediate the points of connection of the core armatures 26 and 30 and is provided with two main contact members 34 and 35 which are mounted upon it adjacent to the point of connection of the core armature 30. The contact member 34 engages a contact member 36 in one position of the contact arm 27, and the contact member 35 engages the contact member 37 in the opposite position of the contact arm. Spring members 38 are connected to the contact arm for balancing the arm to maintain the two contact members 34 and 35 disengaged from the two contact members 36 and 37 when the two electromagnets 20 and 21 are de-energized.

The switch 22 comprises a winding 39, which is connected across the supply conductors 14 and 15 upon engagement of the two contact members 35 and 37, and a core armature 40. The core armature 40 controls the operation of two switch members 41 and 42 and two interlock switch members 43 and 44. The switch members 41 and 42, when operated, serve to connect the armature 12 across the supply conductors 14 and 15 for operating the motor 10 in a counterclockwise direction. The counterclockwise rotation of the motor 10, as heretofore set forth, effects a raising of the electrode 6. The interlock switch member 43 serves to short-circuit the winding 24 of the main control electromagnet 20 upon operation of the switch 22.

The switch 23 comprises a winding 45, which is connected across the supply conductors 14 and 15 upon engagement of the contact members 34 and 36, and a core armature 46. The core armature 46 controls the operation of two switch members 47 and 48 and two interlock switch members 49 and 50. The switch members 47 and 48, upon operation, serve to connect the armature 12 across the supply conductors 14 and 15 for rotating the motor 10 in a clockwise direction to effect a lowering of the electrode 6. The interlock switch member 49, upon operation of the switch 23, serves to short-circuit that portion of a winding 29 of the main control electromagnet 21 which is included between the tap 32 and the upper terminal of the winding. The interlock-switch members 44 and 50, upon the release of the two switches 22 and 23, connect a brake relay 51 across the supply conductors 14 and 15. Upon operation of the relay 51, a dynamic-braking circuit for the armature 12 of the motor 10 is completed through a resistor 52.

The contact arm 27 is connected to the supply conductors 14 and 15 by means of a resistor 53. Condensers 54 and 55 and resistors 56 and 57 are associated with the windings 39 and 45 of the switches 22 and 23, in order to improve the operation of the main contact members 34 and 35 and 35 and 37.

Assuming the current flow through the electrode 6 to be above a normal amount and the potential across the arc formed by the electrode 6 to be below normal value, then the energization of the electromagnet 20 is increased and the energization of the electromagnet 21 is decreased to effect engagement between the contact members 35 and 37.

Upon engagement of the contact members 35 and 37, a circuit is completed from the supply conductor 15, through a portion of the resistor 53, contact arm 27, contact members 35 and 37, and the winding 39 of the switch 22 to the supply conductor 14. Thereupon, the switch 22 is operated for rotating the motor 10 in a counter-clockwise direction to raise the electrode 6 and, accordingly, to reduce the current flow through the electrode 6 and increase the potential across the arc formed by the electrode.

The interlock-switch member 43 is operated by the switch 22 for short-circuiting the winding 24 of the main control magnet 20 to change the setting of the regulator and permit the separation of the contact members 35 and 37 just prior to the obtaining of normal electrical conditions in the circuit of the electrode 6. In case such means were not provided for preventing a hunting action by the regulator, and the electromagnets 20 and 21 were controlled solely in accordance with the electrical conditions of the electrode circuit, it is apparent that the contact members 35 and 37 would not be disengaged until the current flow through the electrode 6 should be reduced to a normal amount and the potential across the arc produced by the electrode 6 should be increased to a normal value. Consequently, the motor 10 and the various moving parts of the system would overtravel and, accordingly, would reduce the current flow through the electrode 6 below a normal amount and increase the potential across the arc formed by the electrode 6 above normal value.

In case the current flow through the electrode 6 is reduced below a normal value and the potential formed by the electrode 6 is increased above a normal value, the energization of the electromagnet 20 is reduced, and the energization of the electromagnet 21 is increased to effect engagement between the contact members 34 and 36. Upon engagement of the contact members 34 and 36, a circuit is completed which extends from the supply conductor 15, through a portion of the resistor 53, contact member 27, contact members 34 and 36 and the winding 45 of the switch 23, to the supply conductor 14. Thereupon, the switch members 47 and 48 complete a circuit through the armature 12 for rotating the motor 10 in a clockwise direction to lower the electrode 6 into the furnace.

In order to prevent any hunting action or over-travel, the interlock switch member 49 short-circuits a portion of the winding 29 of the potential electromagnet 21 to change the setting of the regulator and effect the separation of the contact members 34 and 36 just prior to the obtaining of normal electrical conditions in the circuit of the electrode 6.

In the operation of this system, the contact arm 27 is jointly controlled by the two electromagnets 20 and 21 for rotating the motor 10 in a clockwise or a counter-clockwise direction to lower or raise the electrode 6. During clockwise rotation of the motor 10, any hunting action is prevented by changing the energization of the electromagnet 21, while, during counter clockwise rotation of the motor 10, any hunting action is prevented by varying the energization of the electromagnet 20. Moreover, in case of failure of the supply circuit and de-energization of the two magnets 20 and 21, the contact arm 27 will assume a neutral position, as shown, to prevent any operation whatsoever of the motor 10. Attention is also called to the fact that, in case the electrode 6, for any cause whatsoever, is being lowered and engages the surface of the bath of material 3, the winding 29 of the electromagnet 21 will be short-circuited and, accordingly, immediately disengage the contact members 34 and 36 to prevent any further lowering of the electrode into the bath of material 3.

Modifications in the system and arrangement and location of parts may be made within the spirit and scope of my invention and such modifications are intended to be covered by the appended claims.

I claim as my invention:

1. In a furnace-regulator system, the combination with a movable electrode, and a motor for raising and lowering the electrode, of a regulator comprising an electromagnet energized in accordance with the current flowing through the electrode and a second electromagnet energized in accordance with the potential across the electrode arc, and means for short-circuiting a portion of the potential winding to prevent further lowering of the electrode in case the electrode engages the material being treated.

2. In a furnace-regulator system, a movable electrode, means for raising and lowering the electrode, and a regulator comprising a current and a potential electromagnet for governing said means to maintain a substantially-constant electrode arc, one of said electromagnets being connected to the electrode circuit to be short-circuited and prevent further lowering of the electrode in case it engages the bath of material being treated.

3. In a regulator system, the combination with a supply circuit and a resistance-varying means in said circuit, of a regulator comprising an electromagnet energized in accordance with the current flowing through the supply circuit and a second electromagnet energized in accordance with the potential across the resistance-varying means and means for short-circuiting a portion of the potential winding to prevent further operation of the resistance-varying means under certain conditions.

In testimony whereof, I have hereunto subscribed my name this 20th day of June 1919.

CLARENCE A. BODDIE.